United States Patent
Rantanen

[11] Patent Number: 6,028,321
[45] Date of Patent: Feb. 22, 2000

[54] BALANCING MEANS IN A ROTATING READING DEVICE FOR AN IMAGE PLATE AND BALANCING PROCESS

[75] Inventor: Matti Rantanen, Espoo, Finland

[73] Assignee: Orion-Yhtyma Oy, Finland

[21] Appl. No.: 09/010,681

[22] Filed: Jan. 22, 1998

[30] Foreign Application Priority Data

Jan. 31, 1997 [FI] Finland ................................ 970411

[51] Int. Cl.[7] ................................................ G01N 23/04
[52] U.S. Cl. ........................................ 250/584; 250/581
[58] Field of Search ................................... 250/584, 585, 250/586, 590, 581; 358/494

[56] References Cited

U.S. PATENT DOCUMENTS

| 4,816,923 | 3/1989 | Saotome | ................................ 250/584 |
| 4,829,180 | 5/1989 | Goto et al. | . |
| 5,635,728 | 6/1997 | Cantu et al. | ............................ 250/584 |

FOREIGN PATENT DOCUMENTS

| 59-7945 | 1/1984 | Japan . |
| WO 97/28486 | 8/1999 | WIPO . |

OTHER PUBLICATIONS

Charles F. Hildebolt, DDS, PhD and Michael W. Vannier, MD, PSP Dental Radiography, "PSP—Photostimulable Phosphor Dental Radiography", Jan. 1996, pp. 1–16.

*Primary Examiner*—Edward P. Westin
*Assistant Examiner*—Richard Hanig
*Attorney, Agent, or Firm*—Banner & Witcoff, Ltd.

[57] ABSTRACT

Accessories for a device used for reading a latent image recorded on an image plate by means of X-radiation. The device comprises: a drum element (8), having a concave peripheral surface (7); drive means (20) for rotating (R) the drum element at such a speed that a flexible image plate (1) located inside the drum element against the peripheral surface substantially retains the shape thereof; a light source (14) for focusing a stimulating light on the image plate (1), a light detector (17) for detecting the emitted light, as well as means (27) for moving the stimulating light and the light detector relative to the image plate in a direction (M) of said axis. The accessories comprise at least two balancing blocks (4, 5), which constitute permanent parts of the drum element and are located at a distance from the axis of rotation. The drum element can be balanced, as it is provided with image plates of varying sizes to be read, by shifting at least one balancing block (5) along a circumference (C) of the drum element to a position corresponding to the image plate.

25 Claims, 4 Drawing Sheets

BALANCING MEANS IN A ROTATING READING DEVICE FOR AN IMAGE PLATE AND BALANCING PROCESS

The present invention relates to an accessory for a device used for reading a latent image recorded on a stimulable image plate by means of X-radiation or the like, said device comprising: a drum element, having a concave cylindrical peripheral surface; drive means for rotating the drum element around the axis of said peripheral surface at such a speed that a flexible image plate located inside the drum element against the concave peripheral surface substantially retains the shape of said peripheral surface; a light source for focusing a stimulating light on the image plate, a light detector for detecting the emitted light, as well as means for moving the stimulating light and the light detector relative to the image plate in the direction of said axis. The invention relates also to a method, whereby an accessory of the invention can be used for balancing the drum element in terms of each image plate.

X-ray imaging is generally performed by using such image plates, which develop a latent picture as a result of X-radiation. This latent image or picture is read after the exposure of an X-rayogram by focusing on the plate a point-by-point stimulating beam of light, which leads to the development of an emission light which is activated by the latent image and in turn identified by a detector and converted into an electrical state for its further processing. A multitude of various reading methods and reading devices have been proposed for reading such a latent image on an image plate. Such methods and devices applicable for reading an image plate have been described e.g. in publications JP-59-7945 and U.S. Pat. No. 4,829,180. According to these publications, the image plate is laid on top of a cylinder with its image surface facing outwards and the image plate is read from outside the cylinder by means of a dot-like reader, which includes a detector for a stimulating beam and emitted radiation. During the course of reading, the cylinder is rotated around its axis for producing one image-plate scanning direction, while the other scanning direction which is axial relative to the cylinder is established by moving either the reading head or the cylinder in the direction of the axis of rotation. There is no description in the cited publications as to how the image plate is attached to the outer surface of a cylinder. The article Hildebolt, Vannier: "PSP— Photostimulable Phosphor Dental Radiography"— Washington University School of Medicine, St. Louis, Mo. (Internet=>HTTP://IMACX. WUSTL. EDU./PSP/psp.HTML, Jan. 9, 1996) describes a corresponding image plate reading process, but it explains further that the base of the image plate consists of a thin sheet metal, which adheres magnetically to the outer cylinder surface. The reliability of such a magnetic attachment is not very high, especially if the cylinder is rotated at least at a somewhat reasonable speed. In addition to this, the metal base results in a very rigid image plate, whereby its conformation onto the cylinder is uncertain and the risk of detachment during the rotation is further enhanced. Thus, a drawback in these prior art arrangements is a high risk of the image plate becoming loose and therefore the cylinder must be run at a low rotating speed, which in turn results in the fact that the reading of an image plate is unacceptably slow.

The Applicant's earlier patent application FI-960451 discloses an arrangement, wherein an image plate is fitted inside a rotatable cylinder or drum element, such that the image surface faces inwards and has assumed the shape of a concave cylindrical surface. The image plate is read by means of a reader, which is focused inside the cylinder and, thus, the image plate on the concave image surface thereof and movable in the direction of the rotating axis of the cylinder and which contains a radiation source delivering a stimulating beam and a detector for the radiation emitted from the image plate. This arrangements enables reading rates that are considerably faster than what is achieved by the systems of the above-cited publications, since the cylinder and, thus, the image plate can be rotated at a high speed. As a matter of fact, a high peripheral speed retains the image plate accurately in the shape of a circular cylinder as the centrifugal force presses it against the inner surface of the drum element. However, the high peripheral speed and, thus, the speed of rotation, has an adverse effect that even minor asymmetries in the drum element and varying sizes and/or unequal weights of the image plate cause vibration. This, in turn, impairs at least the reading accuracy and may cause damage to the entire device.

Hence, a primary object of the invention is to provide accessories that can be mounted on such a reading device, in which an image plate is fitted inside a rotatable cylinder and which accessories are capable of eliminating vibration of the device even at high rotational and circumferential speeds of the cylinder. A second object of the invention is to provide such accessories, which are capable of eliminating vibration as the reading device is fitted with image plates of varying sizes and weights. A third object of the invention is to enable simple and quickly executed actions for carrying out the above fitting for image plates of varying sizes and weights. A fourth object of the invention is to enable, whenever necessary, an automatic lay-out for image plates of varying sizes and weights. A yet another object of the invention is to achieve the above-listed other objects by means of a process which is simple and attractive in terms of costs.

The above drawbacks can be eliminated and the above objects are achieved by means of accessories of the invention, which are characterized by what is set forth in the claims, as well as by means of a method of the invention, which is characterized by what is set forth in the claims.

The most important advantage offered by the invention is that, in view of reading an image plate, the accessories and method of the invention can be used in a simple and accurate manner for balancing a rotatable cylinder or drum element containing the image plate regardless of the size and weight of an image plate to be read. This means that the assembly constituted by a drum element and an image plate is always balanced individually and, thus, there will be no unbalance that would cause vibration. In addition, the balancing accuracy can be selected in conjunction with constructing the device and, thus, it is possible to account for the sizes and weights of image plates used during the operation as well as the rotating speed of a cylinder during the course of reading an image plate.

The invention will now be described in detail with reference made to the accompanying figures.

Figure 1:
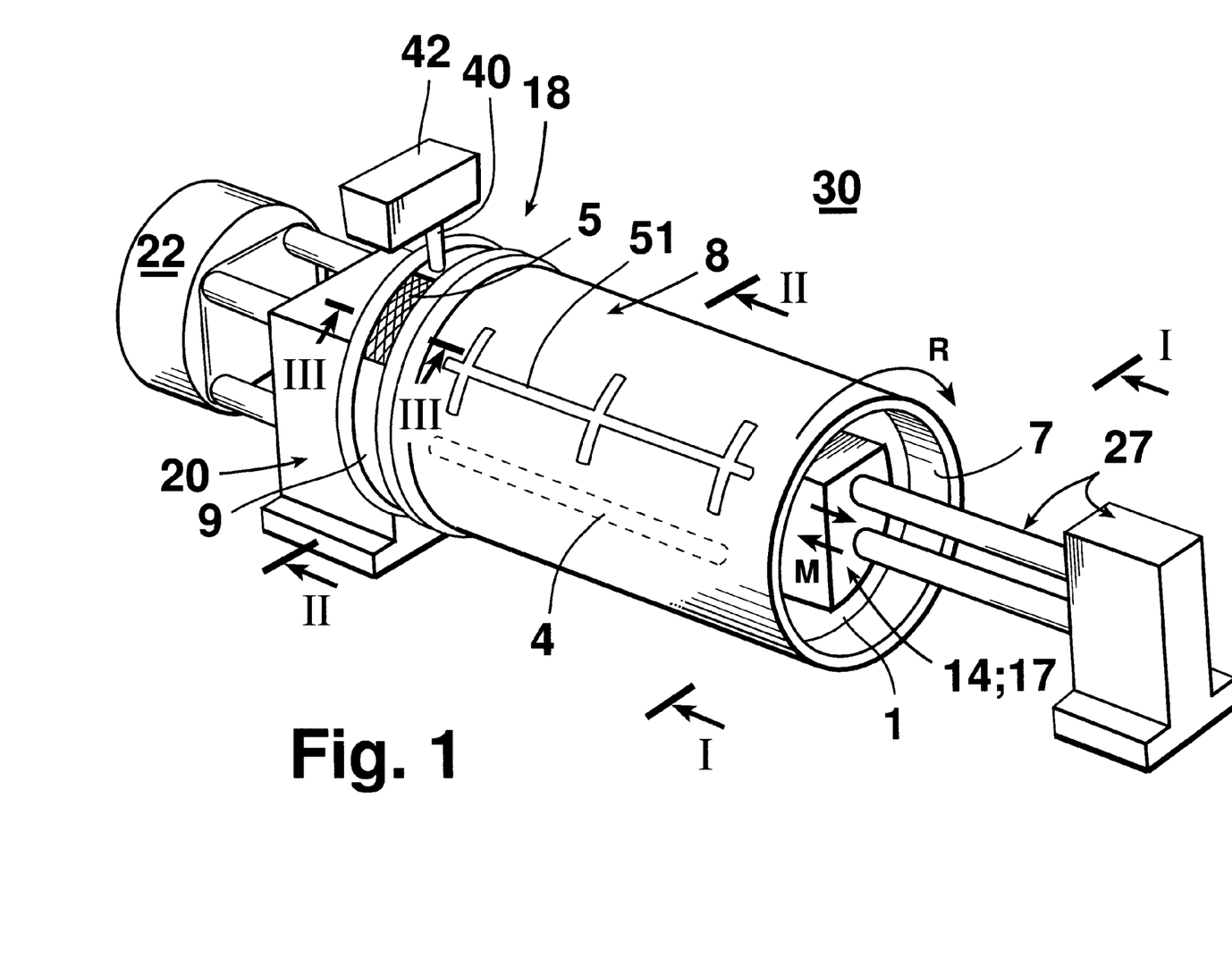
FIG. 1 shows generally from outside and axonometrically such an image-plate reading device, wherein the image plate is fitted inside a rotatable drum element and read by means of a reader focused on a concave image surface inside the drum element. The reading device includes accessories according to a first embodiment of the invention.
Figure 5:
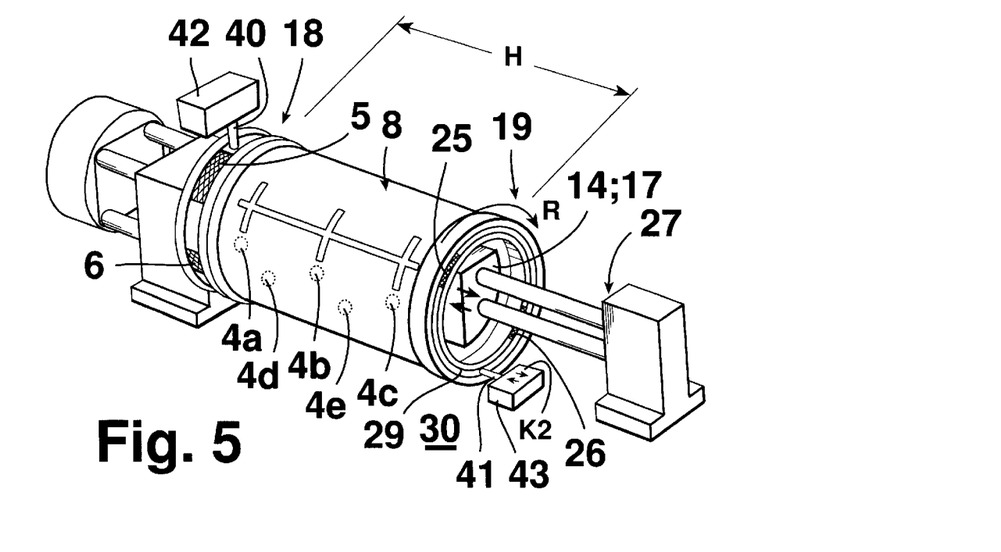
FIG. 5 shows generally from outside and axonometrically such an image-plate reading device, wherein the image plate is fitted inside a rotatable drum element and read by means of a reader focused on a concave image surface inside the drum element. The reading device includes accessories according to a second embodiment of the invention.

FIGS. 1 and 5 show from outside a device, which is used for reading a latent picture recorded on a stimulating image plate by means of X-radiation or other such radiation. This device comprises a drum element 8, provided with an internal, concave, cylindrical, peripheral or circumferential surface 7. In view of reading an image plate 1, said device is placed within an interior 32 of the drum element 8 in such a way that the image plate settles against the concave peripheral surface 7. The device is further provided with drive means 20, which include a motor 22 and which are used for rotating the drum element 8 around an axis 3 of the cylindrical peripheral surface 7. The drum element 8 is normally a circular cylinder or at least its cylindrical peripheral surface 7 is a circular cylinder, the drum element being rotated around the axis 3 thereof. The drive means 20 are used to rotate the drum element at such a speed that the flexible image plate 1 fitted inside the drum element as described above presses against the peripheral surface and conforms essentially to the shape of the peripheral surface. This refers to such a speed Rx that develops a centrifugal force on the image plate 1 sufficient for pressing the image plate closely against the peripheral surface. In terms of its magnitude, the centrifugal force equals a value of at least 30 $g_n$, but preferably at least 100 $g_n$, and typically about 300 $g_n$ for the image plate mass. This way, the flexible image plate 1 can be maintained accurately in the shape of a circular cylinder without detachment hazards. As a matter of fact, the above-mentioned centrifugal force is the very factor making sure that the image plate retains this desired contour.

In addition to this, the image-plate reading device includes a light source 14 for focusing a stimulating light on the image plate 1 and a light detector 17 for detecting a light emitted from the image plate. This light source 14 and the light detector 17 are not described in further detail in this context, as those are not objects of the invention. The light source and light detector are shifted by means of elements 27 relative to the image plate and particularly in a direction M of said axis 3 one way or the opposite way or both ways. FIGS. 1 and 5 depict such an embodiment for the device that the light source 14 and the light detector 17 are movable within the interior 32 of the drum element and e.g. in a cradle 23a along rails 23b. Thus, a radiation-sensitive surface 21 of the image plate 1 faces towards the rotating axis 3. This embodiment is preferred for the reason that it enables the light source 14 and the light detector 17 to be positioned very close to the radiation-sensitive surface 21. Thus, the drum element 8 can be made of a non-transparent material and is indeed usually and preferably made of some such material which is tough, yet lightweight. In principle, the image plate 1 could be set against the peripheral surface 7 also in another way, i.e. the radiation-sensitive surface 21 against the peripheral surface 7. In this case as well, upon rotating the drum element 8, the image plate 1 retains very accurately the shape of a cylinder, as the drum element is driven at a peripheral speed Rx. However, in this case the drum element 8 must be made of a material transmissive to the wavelengths of stimulating radiation and to the wavelengths of emitted light applied in the process of reading an image plate, since the reading of an image plate must be effected from outside 30 the drum element through its wall. Hence, in this case, the light source and light detector are movable on the outside 30 of the drum element 8, but otherwise the same way as described above. However, a drawback of this configuration is that the distance of the light source and light detector from the radiation-sensitive surface 21 becomes larger than in the above-described embodiment, since the wall thickness of the drum element 8 is set in between. In each above described system, the light source and light detector are movable by means of the elements 27 in the direction M of the axis 3 while the drum element and the image plate 1 are rotating, the reading from the radiation-sensitive surface 21 of the image plate being effected along spiral lines, referring to reading lines placed side by side on the surface of an image plate.

FIG. 1 illustrates the most simple arrangement for accessories of the invention. The accessories of the invention comprise at least two balancing blocks included in the rotatable drum element 8. As for these two balancing blocks, at least one, i.e. in FIG. 1 a balancing block 5, is movable along a given circular circumference C of the drum element 8, lying in a plane perpendicular to the axis 3 of the drum element. A second balancing block 4 is stationary and mounted on the periphery of the drum element 8 at a location described in more detail hereinafter. These two balancing blocks 4 and 5 are located at a distance L4 and L5 from the axis 3, and especially the mobile balancing block 5 is movable along the circular circumference C, constituted by the positioning distance L5 of this balancing block 5 as a radius around the axis 3. In most cases, this arrangement can be used to compensate at a sufficient accuracy for weight inhomogeneities resulting from the structural features of a drum element as well as to compensate for weight inhomogeneities caused by the image plates 1 of varying sizes and varying weights along the periphery of the drum element 8. Thus, the balancing blocks of the invention are used for balancing an assembly consisting of the drum element and each individual image plate 1 in view of reading the image plate in such a way that the drum element always rotates R steadily at the peripheral speeds Rx occurring during the course of reading.

Figure 2:
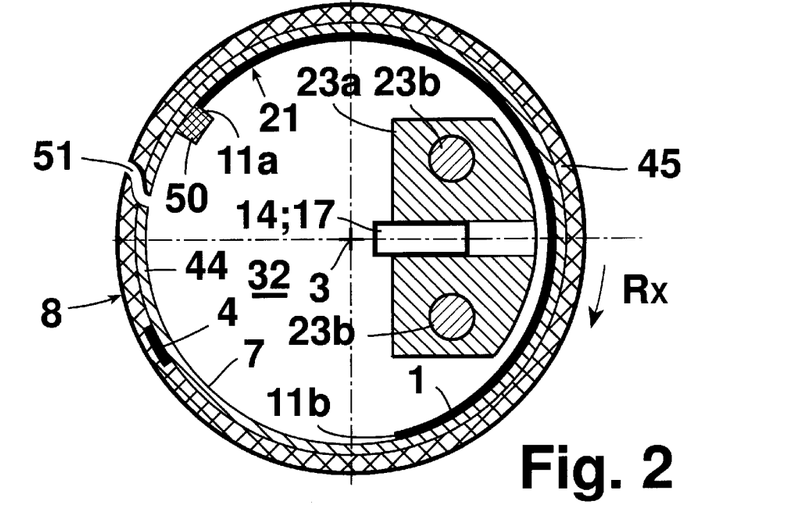
FIG. 2 is a cross-section along a plane I—I in FIG. 1, showing a drum element contained in the reading device of FIG. 1.
Figure 3A:
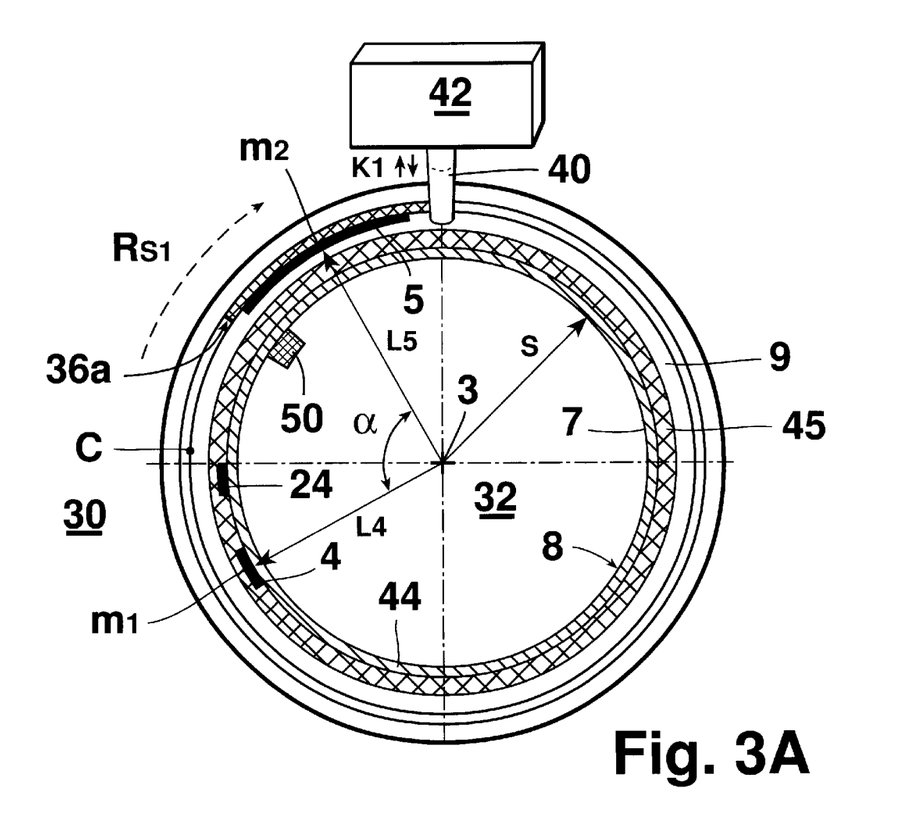
FIG. 3A is a cross-section along a plane II—II in FIG. 1, showing a drum element contained in the reading device of FIG. 1 and including means for relocating a movable balancing block of the invention in a first direction.

At least one immobile balancing block 4 is first of all used for compensating for the effects of permanent asymmetries included in the drum element 8, such as the effects of an image plate insertion and ejection slot 51 and/or an image plate insertion check 50 or the like. In addition to this, the immobile balancing block 4 is used for providing a basic compensation against the asymmetrical mass of the image plates 1 on the periphery of a drum element. Since the image plates, and at least the bulkiest and therefore heaviest image plates, settle principally on a section of the peripheral surface opposite to the image plate insertion and ejection slot 51, the immobile balancing block 4 or, in case this immobile balancing is carried out by means of several physically discrete blocks, the centre of gravity or centre of mass thereof is positioned on the circumference C of a drum element at a point located between ends 11a and 11b of the heaviest $m_{k1}$ image plate inserted in the drum element and at the same time opposite to this image plate, as depicted in FIGS. 1 and 2. FIG. 1 illustrates a simple configuration, which is physically provided with just one strip-like or bar-like immobile balancing block, fitted inside the material of the drum element 8. FIG. 3A depicts an embodiment provided with two immobile balancing blocks 4 and 24 at discrete locations on the circumference C of a drum element. FIG. 5 shows an embodiment with a plurality of immobile balancing blocks 4a–4e, all of which may be positioned inside the drum element material or some of which may be sized or fastened to the outer surface of the drum element 8, e.g. in view of compensating for other-than-normal image plate sizes used by the orderer of the device. The centre of mass established by these several balancing blocks 4a–4e together is located circumferentially of the drum element as defined hereinbefore and hereinafter. This system consisting of a plurality of immobile balancing blocks 4a–4e can be used for compensating more accurately for permanent inhomogeneities or weight discrepancies otherwise occurring e.g. in a lengthwise direction H of the drum element. Thus, if necessary, it is possible to employ either a single immobile or fixed balancing block 4, two balancing blocks 4, 24, or a plurality of balancing blocks 4a–4e, depending on the way that the imbalancing factors are distributed along the circumference C and the length H of a drum element.

In terms of technical manufacturing, the balancing blocks 4, 24, 4a–4e, which are made of some high-density material, such as lead, can be fitted inside the material of the drum element 8 in such a manner that said blocks are secured, e.g. by means of an adhesive, to the outer surface of a very thin-walled circular cylinder 44, made of aluminium or some other lightweight material and constituting the inner surface of the drum element, followed by casting a finishing material 45 for the drum element 8 on top of this assembly. Thus, the balancing blocks, generally designated by reference numeral 4, are enclosed within the wall material 44, 45 of the drum element 8. The casting material 45 can be any appropriate lightweight, rigid, and strong material, and e.g. plastics, such as preferably polyurethane.

Hence, FIG. 1 illustrates a simple balancing system of the invention, wherein the movable balancing block 5 is located at one end 18 of the drum element, which is most preferably that end of the drum element 8 by which the drum element is fastened to the drive means 20. Of course, this embodiment can be provided with more than one movable balancing blocks, such as balancing blocks 5 and 6, as shown in FIG. 5 in reference to the first end 18 of a drum element. This embodiment has not been shown in a separate figure. Furthermore, movable balancing blocks may be included in both ends 18 and 19 of the drum element 8, as shown in FIG. 5, wherein the first end 18 of the drum element is provided with two movable balancing blocks 5 and 6 and the second end 19 of the drum element is provided with two movable balancing blocks 25 and 26. By means of this latter arrangement, the drum element can be balanced in a highly accurate and all-around manner, whereby the image plates can be unequal not only in terms of the sizes and weights thereof but also in terms of the area weight thereof. The embodiment of FIG. 5 can be slightly simplified to provide a version, wherein the number of movable balancing blocks in each end 18 and 19 of the drum element is just one, e.g. blocks 5 and 25, which embodiment has not be specifically shown in the figures. However, this is probably not a highly preferred embodiment. According to the current opinion, preferred embodiments are those, in which one end 18 of the drum includes either one movable balancing block 5 or two movable balancing blocks 5 and 6 or both ends 18 and 19 of the drum include two balancing blocks 5, 6 and 25, 26.

Preferably, the balancing blocks 4–6 and 24–26 of the invention are all at such a distance or spacing L4, L5, L6 from the axis 3, which diverges no more than 20% and preferably no more than 10% from a radius S of the cylindrical peripheral surface 7 of a drum element. With this arrangement, the determination of balancing block masses is simple and minor inequalities in the area weight of an image plate and minor variations in the circumferential speed Rx of a drum element do not substantially affect the balancing process. If it is necessary to read image plates having substantially unequal area weights and/or to apply distinctly varying circumferential speeds Rx during the course of reading, it is absolutely desirable that the balancing blocks be positioned as close as possible to the mean radius of curvature of the image plate 1, which in practice at a sufficient accuracy is generally equal to the radius S of the cylindrical peripheral surface 7 of a drum element. Provided that the densities of image plates are constant and the circumferential speed Rx of a drum element during the course of reading is constant at a sufficient accuracy, the balancing blocks are allowed to differ from the radius S of the peripheral surface to the degree mentioned above, but it is nevertheless preferable that the distances of all balancing blocks 4–6 and 24–26 from the axis 3 be equal. The positioning distances L4, L5, and L6 of these balancing blocks may differ no more than what is defined above, i.e. no more than 20% and preferably no more than 10%, from one another.

Figure 4:
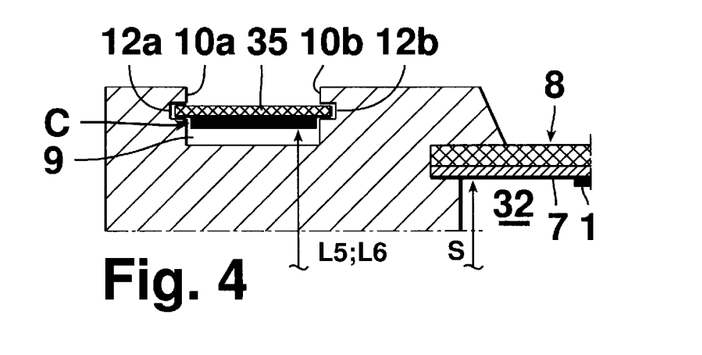
FIG. 4 is a longitudinal section along a plane III—III in FIG. 1, showing one end of a drum element included in the reading device of FIG. 1.

According to a preferred embodiment of the invention, the movable balancing blocks 5, 6; 25, 26 are shiftable in circumferential troughs 9; 29. Each trough lies in its own plane perpendicular to the axis 3, while the movable balancing blocks included in one end 18, 19 of the drum element are preferably located in a common trough. The disposition is clearly shown in FIG. 5, wherein the balancing blocks 5 and 6 are in one and the same trough 9 and the balancing blocks 25 and 26 are in one and the same trough 29, whereby the two balancing blocks 5 and 6 and, respectively 25 and 26, lie in a mutually common plane perpendicular to the axis. Hence, no transverse moment relative to the axis 3 will be created in any position of the balancing blocks. The first end 18 of the drum element includes such a cylindrical trough 9, which is open to the outside 30 of the drum element in the radial direction of the positioning distances L5, L6 of the movable balancing block 5 or the balancing blocks 5 and 6, as conceivable particularly from FIGS. 1 and 4. The second end 19 of the drum element includes a toroidal trough 29, which is open to the outside 30 of the drum element in the direction of the axis 3 at the positioning distances L5, L6 of the movable balancing block 25 or the balancing blocks 25 and 26, as conceivable from FIG. 5. The trough 9 lies in its own plane perpendicular to the axis 3 and the trough 29 lies in its own plane perpendicular to the axis 3. When the balancing block 5, 6 and/or 25, 26 located in such a trough is manipulated in the circumferential direction of the trough, the positioning distance L5, L6 remains unchanged and only the position of the balancing block in the direction of the circumference C changes. It is also possible, as such, to place the balancing blocks 5 and 6 in different troughs as well as the balancing blocks 25 and 26 in different troughs, such as e.g. in a trough extending alongside in the direction of the axis 3, which configuration is not shown in the figure. In this case, the blancing blocks present in the proximity of each other, such as the balancing blocks 5 and 6, can be located anywhere in the circumferential direction C, such as e.g. in alignment with each other, which is not possible in the embodiments shown in the figures. However, this develops a minor moment transverse to the axial direction 3, which may cause vibration to the device as the drum element is rotating. Therefore, the two movable balancing blocks 5 and 6, and respectively 25 and 26, must always have as small an axial gap as possible, i.e. the troughs, in which such blocks are operated, must have an axial length which is as small as possible. This should not be confused with the implementation shown in FIG. 5 that one pair of balancing blocks 5, 6 is included in the first end of a drum element and another pair of balancing blocks 25, 26 is included in the second end 19 of the drum element.

The following description is in reference to FIGS. 3A–3C and 4 and deals in more detail with the disposition of the balancing block 5 in the trough 9 and a mechanism used for manoeuvring the same. It is obvious that the balancing block is in principle equal to the balancing block 5 in terms of its design and operation. The circumferential externally 30 open trough 9 is provided on both flanks 10a and 10b with cylindrical grooves 12a and 12b protruding from the trough in the axial direction. The movable balancing blocks 5, 6 are constituted by strips 35, having a thickness which is equal to the radial thickness of the grooves 12a, 12b and extending across the trough 9 from the first groove 12a to the second groove 12b. In the free space, i.e. outside the trough 9, the strips 35 are straight or have a curvature other than the trough grooves 12a and 12b. Thus, the strips 35 must necessarily be bent to a more curved or alternatively more linear condition as such strips are fitted in the appropriate grooves, said strip 35 being subjected to a bending stress, said stress developing a force transverse to the plane of the strip. This, in turn, results in a frictional force between the strip 35 and the grooves 12a, 12b for immobilizing the strip 35 and, thus, the balancing block 5 constituted thereby, as the drum element is accelerated to its peripheral speed, as the drum element rotates at the peripheral speed Rx, and as it is stopped therefrom. This curvature or linearity of the strip 35 prior to its installation in the trough grooves is selected such that the resulting frictional force is sufficient to immobilize the strip but, at the same time, sufficiently low to allow the shifting of a balancing block constituting the strip in the grooves 12a, 12b along the trough circumference C to a point necessitated by the balancing process. Typically, the balancing block 5, 6 is constructed in such a manner that a mass $m_2$, or respectively $m_3$, of the balancing block is secured to the side becoming concave as the strip 35 is bending and at such a space from the strip that the centre of mass of the balancing block settles at a given distance L5, L6 from the axis 3. Thus, the mass $m_2$, $m_3$ of the balancing block is located on the side of the strip facing towards the axis 3, whereby its immobilization is secured even as the drum element rotates at the high peripheral speed Rx. The mass of a balancing block can be provided by using e.g. lead or some other high-density metal or material. Thus, the material of the actual strip 35 can be selected appropriately, e.g. for developing a desired friction between said strip and the grooves 12a, 12b. The strips 35 can be made of a metal or plastics and, in the above-described design, a relatively thin material, such as a sheet having a thickness within the range of 0.5–3 mm. Of course, it is also possible to design the strip 35 itself from a sufficiently heavy material.

The trough 29 can be similarly fitted with strips, but in this case the latter must be curved in either direction in free space, since the grooves included in both edges of the trough 29 and not shown in detail in the figures lie in a common plane. As a result of the flexural stress developed in the strips, this pre-bending of the strip is also capable of keeping the balancing blocks 25 and 26 stationary in the trough 29 as the drum element rotates at a high peripheral speed. However, the friction can be made sufficiently low, such that these balancing blocks 25, 26 are movable to a point necessitated by the balancing process.

Figure 3B:
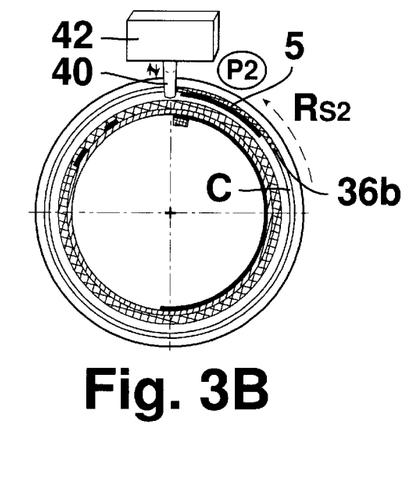
FIGS. 3B–3C show in a view similar to FIG. 3A the position of said means for relocating a movable balancing block for shifting the balancing in a second direction and, respectively, the position thereof during the course of reading an image plate.
Figure 3C:
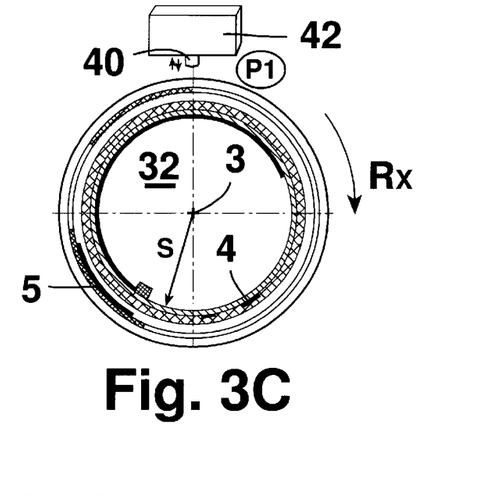

The accessories of the invention further include means for transferring these movable balancing blocks 5, 6, 25, 26 in the direction of the circumference C. The first end 18 of the drum element is provided with a finger 40, which can be operated in a direction $k_1$ extending in a plane perpendicular to the axis of the drum element and typically perpendicularly to the axis 3 at the trough 9. Respectively, the second end 19 of the drum element at the trough 29 is provided with a finger 41, which travels in a direction $k_2$ parallel to the axis 3 whenever the drum element is provided with accessories of the invention at the second end 19. These fingers 40 and 41 have a first position P1 in which the finger is retained outside the trough 9, 29, as shown in FIG. 3C. At this time, the finger 40, 41 is not in contact either with the drum element 8 or with the balancing blocks, but the drum element is free to rotate at the peripheral speed Rx. The fingers 40, 41 have a second position P2 in which the finger extends inside the trough 9, 29, whereby it can come into contact with either edge 36a, 36b of the movable balancing block 5, 6 and, respectively, 25, 26. FIG. 3B illustrates a first condition, in which the finger 40 is in contact with the first edge 36a of the balancing block 5. The finger 40 remains stationary and, thus, the drum element 8 is rotated slowly counter-clockwise in a direction $Rs_2$, the balancing block 5 travelling along the circumference C clockwise in such a way that an angle α between the immobile balancing block 4 and the movable balancing block 5 increases in the case of FIG. 3B. The slow rotation $Rs_2$ of the drum element is continued until the movable balancing block 5 reaches a desired point on the circumference C. FIG. 3A illustrates a condition, in which the finger 40 is in contact with the second edge 36b of the balancing block 5. Thus, with the finger 40 remaining stationary and the drum element 8 being rotated slowly clockwise in a direction $Rs_1$, the balancing block 5 travels along the circumference C counter-clockwise, whereby, in the case of FIG. 3A, an angle α between the immobile balancing block 4 and the movable balancing block 5 diminishes. The drum element is rotated in the direction $Rs_1$ until the movable balancing block 5 reaches a desired point on the circumference C. This way, the finger 40 can be used for shifting the balancing block 5 along the circumference C in either direction. It should be appreciated that, in each case, the angle α can either increase or decrease, depending on how the angle α between the immobile balancing block and the movable balancing block 5 is determined and whether the movable balancing block 5 lies directly opposite to the immobile balancing block 4 or if offset therefrom in either direction. However, an essential feature in this context is that the relative positions of an immobile balancing block and a movable balancing block can be altered this way.

The procedure is precisely analogical to what is described above, even if the trough 9 should be provided with another movable balancing block 6, these two movable balancing blocks being manipulated to desired points, as described above. First moved is one of the balancing blocks 5 or 6 and then the other 6 or 5. Also analogically to what is described above, the second finger 41 is used for carrying the possible balancing blocks 25 and 26 along the circumference thereof to a desired point. The above-described design and procedure constitute a preferred embodiment of the invention. It is also possible to transfer the balancing blocks by keeping the drum element 8 stationary and by adapting the fingers 40, 41, in the manner not shown in the figures, to travel around the drum element in circumferential direction. However, such an embodiment is structurally more complicated although the end result is exactly the same.

The fingers 40 and 41 as well as the drive means 20 are connected to control means 42 and respectively 43, by means of which the fingers 40, 41 are made movable in said directions $k_1$ and $k_2$ between the positions P1 and P2. If the device is provided with both control means 42 and 43, the latter are most often connected also to each other for co-ordinating the action of movable balancing blocks included in the opposite ends of a drum element. The control means 42, 43 are also used for a slow rotation of the drum element 8 clockwise $Rs_1$ and counter-clockwise $Rs_2$ and for rotating the drum element to a point that places the movable balancing blocks 5, 6; 25, 26 at locations intended therefor, which is why the control means 42, 43 are also connected to the drum element drive means 20. The contents and connections of the control means 42, 43 to each other and to the drive means 20 are not described in more detail at this time. The design and programming of the control means can be done by an expert in accordance with per se known principles of engineering and control technology on the basis of information obtainable from this text.

The above-described device of the invention operates and is operated as follows. Prior to the adoption of a device, i.e. generally during the manufacture of a device, at least one immobile balancing block 4 is secured on the circumference of a drum element in such a fashion that the centre of mass of the balancing block or balancing blocks is located essentially opposite to the heaviest image plate to be read inside the drum element, as described above. In addition, at least one permanent but movable balancing block 5 is mounted on the circumference of the drum element, which is movable along the drum element circumference as described above. When the device is used, i.e. after the adoption thereof, for reading a given individual image plate, an image plate size D, i.e. dimensions of the image plate and a mass $m_k$ of the image plate, is identified. The image plate size comprises both its width and length, both of which are designated with reference symbol D. In most cases, the operator is assigned to read such image plates only, whose area weights/densities are in the same order with each other and, thus, it is sufficient to identify just the size D of an image plate, on the basis of which the mass and the position of the centre of mass of this particular image plate is directly calculable. Thereafter, the image plate is placed within the interior 32 of the drum element 8 by inserting it through the slot 51 to such a distance that a first edge 11a of the image plate settles against the check 50 and the position of a trailing edge 11b of the image plate is determined by the image plate size D. This is followed by shifting at least said one movable balancing block 5 or the balancing block 5, 6; 25, 26 in the direction of the circumference C of the drum element to a compensating point, or respectively points, whereat said block, together with the immobile balancing block and the image plate fitted inside the drum element and to be read, constitutes a weight distributed in average as evenly as possible along the drum element circumference. Since, according to the invention, the position of the movable balancing block 5 is verified mathematically on the basis of the masses of various balancing blocks and the mass of an image plate and the position of the centre of mass, the operation can also be carried out in such a sequence that the movable balancing block 5 or balancing blocks 5, 6; 25, 26 are first moved to designated points and only thereafter the image plate is inserted through the slot 51 into the interior 32 of the drum element. In terms of actual working, however, it is generally more practical to follow the first-mentioned sequence. In any case, the immobile balancing block 4, 4a–4e, 24, or respectively the centre of mass thereof, is located on the section of the drum element circumference not reached by the image plate 1 having the heaviest mass $m_{k1}$.

The movable balancing blocks 5, 6; 25, 26 are arranged at such points that the assembly constituted by a drum, an image plate and said balancing blocks together is at least statically in equilibrium and also dynamically in equilibrium as accurately as possible. The balancing blocks are manipulated by means of contact elements, such as the above-described fingers 40 and 41, extending from outside the drum element in the circumferential direction C to the location of a balancing block. The contact element or contact elements 40, 41 are shifted in the directions $k_1$, and respectively $k_2$, to the position P2, followed by rotating the drum element slowly either counter-clockwise in the direction $Rs_2$ or clockwise in the direction $Rs_1$, the balancing blocks generally moving done at a time along the drum element circumference C. The two balancing blocks, such as the balancing blocks 5 and 6, possibly included in the same trough 9, and respectively 29, are transferred as described above first one and then the other in such a manner that the angle of rotation α thereof relative to the immobile balancing block 4 or balancing blocks 4 and 24 is such that the drum develops an equilibrium. As soon as the balancing block has reached a desired position, the drum element 8 is stopped and the engagement of the contact elements 40, 41 with the balancing block is disconnected. Hence, the movable balancing block stops on the drum element circumference at a point determined by the drum element turning angle α equivalent to this condition. When carried by means of the contact element, said balancing block is in contact optionally against either end 36a or 36b of the circumferential length of said balancing block. If the above-mentioned other type of transfer of balancing blocks is applied, wherein the drum element is stationary and the contact element is moved around the drum element in its circumferential direction, the operation is analogical to what is described above. Thus, the contact element is rotated around the drum element through such an angle that the movable balancing block reaches a desired point, whereafter the circumferential movement of the contact element is stopped and the engagement of the contact element with the balancing block is disconnected. As pointed out above, the plurality of movable balancing blocks possibly included in a single trough 9, or respectively 29, are generally carried one at a time to desired points but balancing blocks included in different troughs 9 and 29 can of course be moved simultaneously for positioning the same at the same point in both ends 18 and 19 of the drum. Thus, the balancing blocks 5 and 25 can be moved simultaneously to the proper positions thereof and, respectively, the balancing blocks 6 and 26 can be moved simultaneously to the proper positions thereof. However, the balancing blocks 5 and 6 are shifted one at a time to the proper positions thereof and similarly the balancing blocks 25 and 26 are moved one at a time to the proper positions thereof. Naturally, this latter rule does not apply to the situation, in which the balancing blocks 5 and 6, or respectively 25 and 26, included in the same trough must be moved into contact with each other and in that condition to any given position.

In order to enable the above-described balancing process, the circumference of a drum element is provided with at least one immobile balancing block 4 at a distance L4 from the axis thereof and with at least one movable balancing block 5 at a distance L5. A mass $m_1$ of the immobile balancing block and a mass $m_2$ of the movable balancing block are selected on the basis of sizes D of image plates 1 about to be read with the device, i.e. on the basis of the length and width of an image plate, as well as by means of masses $m_k$ of the image plates in such a manner that the balancing of a lightest $m_{k3}$ image plate is established as the movable balancing block or possible movable balancing blocks is or are located opposite to the immobile balancing block and the balancing of a heaviest $m_{k1}$ image plate is established as the immobile balancing block and the movable balancing blocks are in line with or close to each other. Therefore, the immobile balancing block or immobile balancing blocks 4, 24 are in terms of the effective total mass $m_1$ thereof unequal to the overall effective total mass $m_2$ of the movable balancing block or movable balancing blocks. Thus, the balancing of the lightest $m_{k3}$ image plate occurs as a result of a difference between the effective masses $m_1$ and $m_2$ since, after all, the masses $m_1$ and $m_2$ are in this case located on the opposite sides of the drum element circumference. On the other hand, the balancing of the heaviest $m_{k1}$ image plate is effected by means of a sum of the effective masses $m_1$ and $m_2$ since, in this case, the masses are either in line with or close to each other. The image plates of other sizes can be balanced by arranging the movable balancing block 5 or movable balancing blocks 5, 6; 25, 26 between the above extreme positions, whereby the action thereof settles between the above-described maximum and minimum effects. In this conjunction, it should be noted that, in the above type of drum element, the centres of mass of image plates placed within the drum do not settle in the same spot at all, but the location of a centre of mass depends on the size of a particular image plate. The reason for this is that all image plates settle against the check 50, the centre of mass being positioned in the middle of the circumferential length of an image plate, which position naturally varies according to the size of a particular image plate. On the other hand, such positioning of an image plate against the check 50 is necessary for the reason that otherwise the high peripheral speed Rx may cause sliding of the image plate 1 during the course reading along the peripheral surface 7. Naturally, this is not desirable.

Figure 6A:
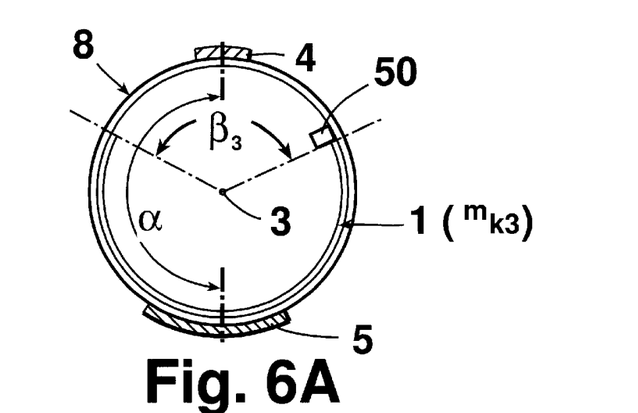
FIGS. 6A–6C show a cross-section of the drum element, indicating the location of an immobile balancing block of the invention as well as various locations of a movable balancing block, with image plates of varying sizes and weights fitted inside the drum element.
Figure 6B:
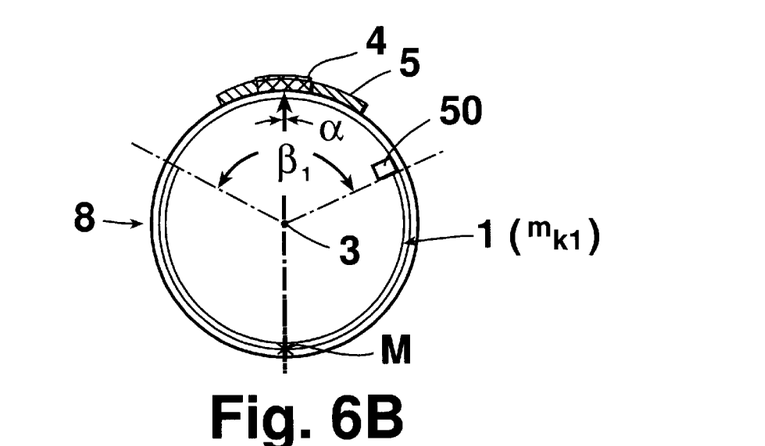

In more detail, the magnitude of these masses can be commented on as follows. It should be appreciated here that the mass $m_1$ of the immobile balancing block is used to refer to a total of the masses of the balancing blocks 4, 4a–4e, and 24. In addition to this, the hypothesis is that there are two movable balancing blocks 5 and 6, having masses $m_2$ and, respectively $m_3$. In this conjunction, in turn, the mass $m_2$ refers to a sum of the masses of movable balancing blocks to be always placed in the same position in the circumferential direction, like e.g. the mass $m_2$ refers to the weights of balancing blocks 5 and 25 together and e.g. the mass $m_3$ to the weights of balancing blocks 6 and 26 together. It is obvious that, if the number of balancing blocks is less, the masses $m_1$, $m_2$, and $m_3$ are constituted by whichever of these are used at a given case or, possibly, the mass $m_3$ is non-existent, as described above. The lightest $m_{k3}$ image plate 1 to be accommodated within a drum element has a missing mass $m_{p3}$, constituted by a section between the image plate ends 11a and 11b, where there is no image plate. For this section, it is possible to calculate this imaginary missing mass $m_{p3}$ by multiplying the area weight of the image plate by the width of the image plate in the direction of the axis 3 and by the dimension between the ends 11a and 11b thereof over the section having no image plate. Respectively, the heaviest image plate to be accommodated within a drum element has a so-called missing mass $m_{p1}$, constituted by a section having no image plate and extending between the ends 11a and 11b of this heaviest $m_{k1}$ image plate. For this section, it is possible to calculate this imaginary missing mass $m_{p1}$ by multiplying the area weight of the image plate by the image plate width in the direction of the axis 3 and by the dimension between the ends 11a and 11b thereof over the section having no image plate. In FIGS. 6A and 6B, the missing mass $m_{p3}$ corresponds to the image plate mass imagined for the size of a sector angle $\beta_3$ and $m_{p1}$ to the image plate mass imagined for the size of a sector angle $\beta_1$. Thus, it should be noted that the missing mass established by the sector angle $\beta_3$ is less than the missing mass established by the sector angle $\beta_1$, although, in this case, the angle $\beta_3$ is equal to $\beta_1$, since the lighter $m_{k3}$ image plate is much narrower in the direction perpendicular to the plane of the figure than the width of the heaviest $m_{k1}$ image plate in the same direction. In this arrangement, the masses must work out equations $m_{p3}=m_1+m_2+m_3$ and $m_{p1}=m_1-(m_2+m_3)$.

Figure 6C:
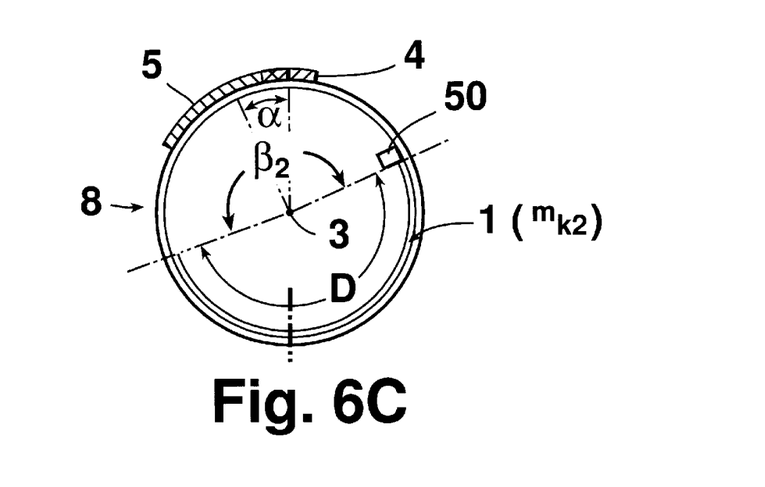

The image plate sizes and weights of masses depicted in FIGS. 6A–6C can be presented as a practical example of the dimensioning. FIG. 6A illustrates the lightest $m_{k3}$ image plate 1, having a size of 148×298 mm and a weight of 61.3 g, the sector angle $\beta_3=126°$ making up the missing mass $m_{p3}=33$ g. On the other hand, FIG. 6B illustrates the heaviest $m_{k1}$ image plate 1, having a size of 238×298 mm and a mass of 98.6 g, the sector angle $\beta_1=126°$ making up the missing mass $m_{p1}=53$ g. With these values, the immobile balancing block 4 will have a mass $m_1=43$ g and the movable balancing block 5 will have a mass $m_2=10$ g. The immobile balancing block 4 is positioned opposite to the centre of mass M of the heaviest $m_{k1}$ image plate and, in order to balance this image plate, the movable balancing block 5 is at the same location as the immobile balancing block 4, i.e. the angle $\alpha=0°$. In the case of the lightest $m_{k3}$ image plate, the movable balancing block 5 is located opposite to the immobile balancing block 4, i.e. the angle $\alpha=180°$. FIG. 6C illustrates the image plate 1, having a weight of $m_{k2}=58.9$ g which settles between the heaviest and lightest image plate. In this case, this image plate has a size of 178×238 mm and a weight of 58.9 g, the missing mass $m_{p2}$ made up by the angle $\beta_2=173°$ being 54 g. Thus, the movable mass is separated by a small angle $\alpha=23.5°$ from the immobile balancing block, the effective balancing mass $m_1+m_2$ settling on the bisector of the angle $\beta_2$. In this case, the effective centre of mass of the balancing blocks is exactly in the correct position but, to be exact, lacks a weight of 1 g. However, this is such a tiny difference that it has no practical significance. The hypothesis in the examples of FIGS. 6A–6C is that other imbalance-causing factors of the drum element 8 besides the image plate have been compensated for separately e.g. by means of the supplemental balancing blocks 4a–4e, 24 shown in FIGS. 3A and 5. In these examples, the area weight of the image plate is considered to be 0.139 g/cm² and the inner diameter of the drum is 2·S=146 mm.

In the process of operating the above-described image plate reading device and determining the positions of movable balancing blocks required by any individual image plate 1, it is necessary to identify the size D and the mass $m_k$ of the image plate. The operator can do this visually, which is usually simple as a given application is generally effected by using only a few image plate sizes, which are immediately recognized and distinguished from each other by the operator. Thereafter, he or she can program the control means 42 and 43 on this basis. It is of course possible to measure or weigh each image plate submitted to reading either manually or automatically and to feed such information or the set-up data acquired thereby into a control unit. In most cases, however, this is only necessary when an image plate not included in the normal selection is submitted to reading. One simple and reliable option is to provide each image plate with appropriate codes, such as e.g. numerical-alphabetical codes or line codes, as information about the size and mass of a relevant image plate, said information being read either manually or automatically and fed into the control means 42, 43. The control means may be provided with pre-filed setup data, i.e. the positions for movable balancing blocks pre-calculated for each type of image plate to be used. The control means may also be provided with pre-programmed calculation instructions, capable of calculating for each image plate to be read the positions of the movable balancing blocks 5, 6; 25, 26. Of course, the calculation can be done manually as well. The balancing process must have a sufficient accuracy to eliminate vibration or other adverse effects from the device as the drum element is driven at a peripheral speed, which applies to the image plate a centrifugal force which, as mentioned above, is at least 30 $g_n$, often at least 100 $g_n$, and typically about 300 $g_n$. In most cases, this means that the total amount of unbalance may be no more than 10% of the weight of an image plate and generally must be less than 4% of the weight of an image plate. In most cases, there are no more problems if the unbalance is less than 1% or 2% of the weight of an image plate. Of course, it should be appreciated that this acceptable amount of unbalance depends on the applied peripheral speed Rx.

The control means 42, 43 place the movable masses at correct locations or angular positions α by the application of any suitable technology. The centre of mass established by immobile balancing blocks may be marked, e.g. during the process of manufacturing a drum element, on the structure thereof by any appropriate means and between the drive means 20 and the drum element 8 may be fitted elements identifying the relative position thereof, including at least mechanical, optical, and magnetic elements. However, this mechanism is not specified in more detail in this context, since the design of such equipment is obvious for an expert as soon as he or she has learned about the above-disclosed inventional features. It is self-evident that the positions for movable balancing blocks can be found correctly by effecting the transfers thereof with manual monitoring. For the reasons of safety, however, the actual movement of movable balancing blocks along the circumference C of the drum element 8 should not be effected manually but, instead, it is necessary to use mechanical elements. If necessary, the correct positioning can be monitored visually, e.g. by means of suitable accessories.

What is claimed is:

1. A device which uses radiation to read a latent image recorded on a stimulable image plate, said device comprising: a drum element having a concave cylindrical peripheral surface; drive means for rotating the drum element around an axis extending through said drum element at a speed such that when a flexible image plate is located inside the drum element against the concave peripheral surface, the image plate will substantially retain the shape of said peripheral surface; a light source for focusing a stimulating light on the image plate; a light detector for detecting the emitted light; means for moving the stimulating light and the light detector relative to the image plate in a direction extending parallel to the length of said axis; and accessories comprising at least two balancing blocks forming parts of the drum element and being spaced from said axis, wherein at least one of said balancing blocks is movable along a circumference constituted by a positioning distance of said at least one movable balancing block as a radius around the axis, wherein said balancing blocks balance the drum element as image plates of varying sizes are accommodated therein and read.

2. The device as set forth in claim 1 wherein at least one of the balancing blocks is immobile and located on the drum element at a point that is capable of lying between two ends of the heaviest image plate to be accommodated within the drum or opposite a circumferential midpoint of the heaviest image plate.

3. The device as set forth in claim 1 wherein the balancing blocks are located at a distance from the axis that is at least 80% of the length of a radius extending between said axis and the cylindrical peripheral surface of the drum element.

4. The device as set forth in claim 1 wherein the at least one movable balancing block is located at one end of the drum element for achieving a static balancing effect.

5. The device as set forth in claim 1 wherein the at least one movable balancing block includes at least two movable balancing blocks each located at a respective one of the ends of the drum element for achieving a dynamic balancing effect.

6. The device as set forth in claim 1, 4 or 5 wherein said balancing blocks include at least two immobile balancing blocks for compensating for constant structural asymmetries of the drum element.

7. The device as set forth in claim 6 wherein said structural asymmetries include an image plate insertion and ejection slot.

8. The device as set forth in claim 2 wherein said at least one movable balancing block includes a plurality of movable balancing blocks; and wherein a total sum of the masses of the movable balancing blocks is capable of substantially equaling the mass of the lightest image plate to be accommodated within the drum element for achieving a homogeneous weight distribution along the circumference of the drum element when the lightest image plate is located within said drum element.

9. The device as set forth in claim 2 or 5 wherein a total sum of masses of the movable balancing blocks and the mass of the at least one immobile balancing block is approaching or is substantially equal to a missing mass that results when the lightest image plate to be accommodated is positioned within said drum element so that a homogeneous weight distribution in the circumferential direction of the drum element can be achieved; and wherein a difference between the mass of the at least one immobile balancing block and the masses of the movable balancing blocks is approaching or is substantially equal to a missing mass that results when the heaviest image plate to be accommodated is positioned within said drum element, so that a homogeneous weight distribution along the circumference of the drum element can be achieved.

10. The device as set forth in claim 1, 3 or 5 further comprising circumferential troughs which each lie in a plane extending perpendicular to the axis and which are open to an exterior of the drum element in the radial direction of said positioning distance or in the direction of the axis; and wherein each of said movable balancing blocks is movably positioned in one of said circumferential troughs.

11. The device as set forth in claim 1 further comprising a circumferential trough having cylindrical grooves protruding therefrom in a direction extending parallel to the axis; and wherein said at least one movable balancing block includes a strip which extends across the trough and within said grooves, said strip being curved in conformity with the shape of the trough and being subject to flexural stresses.

12. The device as set forth in claim 11 wherein said at least one movable balancing block is secured on a side of the strip that becomes concave when said strip is positioned within the cylindrical groove so that a center of mass of said at least one movable balancing block is located at said positioning distance from the axis.

13. The device as set forth in claim 10 further comprising a finger-like member which is movable between first and second positions in a plane extending perpendicular to the axis or in a plane extending in the direction of the axis, said finger-like member being located outside a respective one of said troughs when in said first position and being located within said respective trough when in said second position for contacting and moving the movable balancing block within said respective trough in a circumferential direction; and wherein the accessories further include control means for shifting the finger-like member between the first and second positions and for slowly rotating the drum element prior to the reading of an image plate so as to move at least one of the movable balancing blocks in order to balance the drum element.

14. The device as set forth in claim 1 wherein the drive means comprise a motor for rotating the drum element at a peripheral speed that is capable of generating a centrifugal force of at least 30 $g_n$, or at least 100 $g_n$, or substantially 300 $g_n$ on the image plate when positioned within said drum element for pressing the image plate against the concave peripheral surface of the drum element.

15. The device as set forth in claim 1 wherein the light source for focusing a stimulating light on a light-sensitive surface of the image plate and the light detector are positioned within the drum element.

16. The device as set forth in claim 1 wherein said at least two balancing blocks include at least one immobile balancing block and at least two movable balancing blocks, said at least two movable balancing blocks are each positioned in a plane extending perpendicular to said axis and are independently movable relative to each other and said immobile balancing block.

17. The device as set forth in claim 16 wherein said at least two movable balancing blocks are positioned in the same plane.

18. A method for balancing a device which uses radiation to read latent images recorded on stimulable image plates, said method comprising the steps of:
    a) providing said device including: a drum element having a concave cylindrical peripheral surface; drive means for rotating the drum element around an axis of said peripheral surface at such a speed that a flexible image plate located inside the drum element against the concave peripheral surface can substantially retain the shape of said peripheral surface; a light source for focusing a stimulating light on the image plate; a light detector for detecting the emitted light; and means for moving the stimulating light and the light detector relative to the image plate in a direction that extends parallel to the length of said axis;
    b) securing at least one immobile balancing block on the periphery of the drum element so that the center of mass of said at least one immobile balancing block can be located substantially opposite to the heaviest image plate to be read by said device;
    c) placing at least one movable balancing block on an outer periphery of the drum element;
    d) providing an image plate to be read;
    e) identifying a size and a mass of the provided image plate prior to reading said provided image plate; and
    f) moving said at least one movable balancing block in a circumferential direction along the drum element to a compensating point prior to reading the provided image plate so that the weight of the at least one immobile balancing block, the weight of the at least one movable balancing block and the weight of the provided image plate are substantially evenly distributed along the circumference of the drum element.

19. The method as set forth in claim 18 wherein said at least one movable balancing block includes a plurality of movable balancing blocks; and said moving step includes moving said plurality of movable balancing blocks to respective compensating points before said provided image plate is placed within the drum element.

20. The method as set forth in claim 18 wherein said at least one movable balancing block includes a plurality of movable balancing blocks; and said moving step includes moving said plurality of movable balancing blocks to respective compensating points after said provided image plate has been placed within the drum element.

21. The method as set forth in claim 18 wherein said moving step comprises the steps of:
    a) contacting the at least one movable balancing block from an exterior of the drum element with a contact member extending proximate to the at least one movable balancing block;
    b) slowly rotating the drum element whereby the contact member keeps said at least one movable balancing block stationary while said drum element moves relative thereto through a rotating angle in the circumferential direction of the drum element; and
    c) separating the contact member and the movable balancing block so that said movable balancing block stops on the circumference of the drum element at a point dictated by the rotating angle.

22. The method as set forth in claim 21 wherein the contact member comprises an element which is movable in a plane extending perpendicular to the axis of the drum element or in a plane extending parallel to the axis of the drum element.

23. The method as set forth in claim 18 wherein prior to the step of providing said device, said method further comprises the steps of:
    a) determining the sizes and masses of the image plates to be read with said device; and
    b) selecting masses for the at least one immobile balancing block and the at least one movable balancing block so that when the at least one movable balancing block is positioned opposite to the at least one immobile balancing block within the drum element, balancing of the lightest image plate to be read can be achieved and, when the at least one movable balancing block is aligned with or substantially proximate to the at least one immobile balancing block, balancing of the heaviest image plate to be read can be achieved.

24. The method as set forth in claim 18 or 23 wherein said method further comprises the steps of positioning the image plate to be read against the peripheral surface of the drum element and setting the image plate against an axially directed check included in the peripheral surface, and wherein said securing step includes mounting said at least one immobile balancing block on a portion of the circumference of the drum element that is spaced from the heaviest of the image plates when the heaviest of the image plates is positioned within said drum element.

25. The method as set forth in claim 18 or 21 wherein said identifying step includes visually or mechanically identifying the size and mass of the provided image plate; and wherein said method further comprises the steps of:

a) supplying said identified size and mass to a means for controlling the movement of said contact element and the positioning of the at least one movable balancing block to approach uniform weight distribution along the circumference of the drum element while the provided image plate is being read; and B) rotating said drum element at a peripheral speed that subjects the provided image plate to a centrifugal force of at least 30 $g_n$, or at least 100 $g_n$, or substantially 300 $g_n$.

* * * * *